US008669329B2

(12) United States Patent
Ohtani et al.

(10) Patent No.: US 8,669,329 B2
(45) Date of Patent: Mar. 11, 2014

(54) THERMOPLASTIC ELASTOMER COMPOSITION, A METHOD FOR PRODUCING A MOLDED BODY, AND A MOLDED BODY

(75) Inventors: Kohsuke Ohtani, Chiba (JP); Yasuhito Ijichi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 22 days.

(21) Appl. No.: 12/423,854

(22) Filed: Apr. 15, 2009

(65) Prior Publication Data
US 2009/0270561 A1    Oct. 29, 2009

(30) Foreign Application Priority Data

Apr. 24, 2008 (JP) ................................ 2008-113505
Apr. 24, 2008 (JP) ................................ 2008-113506

(51) Int. Cl.
*C08L 23/00* (2006.01)
*C08L 23/04* (2006.01)

(52) U.S. Cl.
USPC .......................................... 525/240; 525/191

(58) Field of Classification Search
USPC ........................................................ 525/240
See application file for complete search history.

(56) References Cited

U.S. PATENT DOCUMENTS

2004/0242784 A1* 12/2004 Tau et al. ...................... 525/240
2006/0189744 A1*  8/2006 Tse et al. ...................... 524/447
2006/0281868 A1* 12/2006 Sudhin et al. ................. 525/240
2007/0225446 A1*  9/2007 Nakano et al. ................ 525/240

FOREIGN PATENT DOCUMENTS

JP        8-27331 A    1/1996
JP     2000-72937 A    3/2000
JP     2008-45037 A    2/2008

OTHER PUBLICATIONS

Otani et al., Computer generated English translation of JP 2008-045037 A, Feb. 28, 2008.*

* cited by examiner

*Primary Examiner* — Peter F Godenschwager
*Assistant Examiner* — David Karst
(74) *Attorney, Agent, or Firm* — Sughrue Mion, PLLC

(57) ABSTRACT

A thermoplastic elastomer is provided that includes a propylene-based resin and an ethylene-α-olefin copolymer rubber, and has a crystallization time at 130° C. measured by differential scanning calorimeter (DSC) of from 250 to 1,000 sec. There are also provided a method for producing a molded body, the method including a step of preparing the thermoplastic elastomer composition and a step of injection molding the thermoplastic elastomer composition, and a molded body produced by the method.

10 Claims, No Drawings

THERMOPLASTIC ELASTOMER COMPOSITION, A METHOD FOR PRODUCING A MOLDED BODY, AND A MOLDED BODY

TECHNICAL FIELD

The present invention relates to a thermoplastic elastomer composition, a method for producing a molded body, and a molded body.

BACKGROUND OF THE INVENTION

An airbag cover of an automobile airbag system is required to have rigidity suitable for applications such as a driver's seat or a passenger seat, to have high tensile elongation at break so that the airbag cover does not split other than in a tear line section (a thin section of the airbag cover provided so as to make the airbag cover split when the airbag is deployed), to have high impact strength at low temperature so as to withstand use in a cold district, to have an appearance appropriate for an interior component of an automobile, etc.

As such an airbag cover, many injection-molded bodies formed using a polyolefin-based thermoplastic elastomer composition that contains a propylene-based resin and an ethylene-propylene-non-conjugated diene copolymer rubber have been proposed. For example, JP•A•8-27331 proposes an injection-molded body formed using a thermoplastic elastomer composition that contains a propylene-ethylene random copolymer, an ethylene-propylene-non-conjugated diene copolymer rubber, and a low-density polyethylene. JP•A•2000-72937 proposes an injection-molded body formed using a thermoplastic elastomer composition that contains a propylene-ethylene copolymer, a propylene-1-butene random copolymer, and two types of ethylene-propylene-5-ethylidene-2-norbornene copolymer rubbers. Furthermore, JP•A•2008-45037 proposes an injection-molded body formed using a thermoplastic elastomer composition that contains a propylene-based resin produced by multistage polymerization and an ethylene-propylene-5-ethylidene-2-norbornene copolymer rubber.

BRIEF SUMMARY OF INVENTION

However, the injection-molded bodies formed using the polyolefin-based thermoplastic elastomer composition tend to cause uneven gloss in the tear line section, and are not fully satisfactory in terms of appearance.

Under such circumstances, it is an object of the present invention to provide a polyolefin-based thermoplastic elastomer composition that can give an airbag cover having excellent appearance.

The present invention provides (1) to (15) as follows:

(1) A thermoplastic elastomer composition comprising a propylene-based resin; and an ethylene-α-olefin copolymer rubber; wherein the composition has a crystallization time at 130° C. measured by differential scanning calorimeter (DSC) of from 250 to 1,000 sec, (2) The thermoplastic elastomer composition according to (1), wherein the composition has a swell ratio of from 1.12 to 1.8, (3) The thermoplastic elastomer composition according to (1), wherein the composition has a melt viscosity at a temperature of 200° C. and a shear rate of 1,216 $sec^{-1}$ of from 50 to 200 Pa·s, (4) The thermoplastic elastomer composition according to (1), wherein the propylene-based resin has a propylene unit content of from 70% to 100% by weight.

(5) The thermoplastic elastomer composition according to (1), wherein the propylene-based resin has a melt flow rate (230° C., 21.18 N) of from 10 to 300 g/10 min, (6) The thermoplastic elastomer composition according to (1), wherein the propylene-based resin comprises component (A) and/or component (B), and the ethylene-α-olefin copolymer rubber comprises component (C), component (A): a propylene-based resin comprising 70% to 90% by weight of component (p) and 30% to 10% by weight of component (q) relative to 100% by weight of component (A) and having a melting temperature measured by differential scanning calorimeter of not less than 155° C., component (p): a propylene-based polymer having a propylene-based monomer unit content of from 90% to 100% by weight, component (q): an ethylene-α-olefin copolymer having an ethylene-based monomer unit content of from 20% to 80% by weight;

component (B): a crystalline propylene-ethylene copolymer having a propylene-based monomer unit content of from 70% to 97% by weight, an ethylene-based monomer unit content of from 30% to 3% by weight, a melt flow rate (230° C., 21.18 N) of from 1 to 100 g/10 min, and a melting temperature measured by differential scanning calorimeter of from 80° C. to 130° C.;

component (C): an ethylene-α-olefin copolymer rubber having an ethylene-based monomer unit content of from 35% to 75% by weight, an α-olefin-based monomer unit content of from 65% to 25% by weight, and a Mooney viscosity $ML_{1+4}$, 125° C. of from 30 to 100, (7) The thermoplastic elastomer composition according to (6), wherein the composition comprises 100 parts by weight of component (A), 10 to 100 parts by weight of component (B), and 50 to 200 parts by weight of component (C), (8) The thermoplastic elastomer composition according to (6), wherein component (A) is a propylene-based resin that does not have a threo-form —$CHCH_3$—$CHCH_3$— structure, and component (B) is a crystalline propylene-ethylene copolymer that has a threo-form —$CHCH_3$—$CHCH_3$— structure, (9) The thermoplastic elastomer composition according to (6), wherein component (A) has the ratio of [ηcxs] to [ηcxis] ([ηcxs]/[ηcxis]) of from 1.6 to 8,

[ηcxs]: the intrinsic viscosity (135° C., tetralin) of a xylene-soluble fraction at 20° C.,

[ηcxis]: the intrinsic viscosity (135° C., tetralin) of a xylene-insoluble fraction at 20° C.,

(10) The thermoplastic elastomer composition according to (6), wherein component (A) has a melt flow rate (230° C., 21.18 N) of from 10 to 300 g/10 min,

(11) The thermoplastic elastomer composition according to (6), wherein component (B) has a crystallization enthalpy of not less than 20 mJ/mg,

(12) The thermoplastic elastomer composition according to (6), wherein component (C) is an ethylene-propylene copolymer or an ethylene-propylene-5-ethylidene-2-norbornene copolymer and has an ethylene unit content of from 55% to 70% by weight, a propylene unit content of from 45% to 30% by weight with the total of ethylene and propylene units as 100% by weight, and a 5-ethylidene-2-norbornene unit content of from 0% to 10% by weight with the polymer as 100% by weight,

(13) A method for producing a molded body, the method comprising the steps of preparing the thermoplastic elastomer composition according to (1); and injection molding the thermoplastic elastomer composition,

(14) A molded body produced by the method according to (13),

(15) A thermoplastic elastomer composition comprising 100 parts by weight of component (A), 10 to 100 parts by weight of component (B), and 50 to 200 parts by weight of component (C), component (A): a propylene-based resin comprising 70% to 90% by weight of component (p) and 30% to 10% by weight of component (q) relative to 100% by weight of component (A) and having a melting temperature measured by differential scanning calorimeter of not less than 155° C., component (p): a propylene-based polymer having a propylene-based monomer unit content of from 90% to 100% by weight, component (q): an ethylene-α-olefin copolymer having an ethylene-based monomer unit content of from 20% to 80% by weight;

component (B): a crystalline propylene-ethylene copolymer having a propylene-based monomer unit content of from 70% to 97% by weight, an ethylene-based monomer unit content of from 30% to 3% by weight, a melt flow rate (230° C., 21.18 N) of from 1 to 100 g/10 min, and a melting temperature measured by differential scanning calorimeter of from 80° C. to 130° C.;

component (C): an ethylene-α-olefin copolymer rubber having an ethylene-based monomer unit content of from 35% to 75% by weight, an α-olefin-based monomer unit content of from 65% to 25% by weight, and a Mooney viscosity $ML_{1+4}$, 125° C. of from 30 to 100.

DETAILED DESCRIPTION OF THE INVENTION

The thermoplastic elastomer composition of the present invention contains a propylene-based resin and an ethylene-α-olefin copolymer rubber.

The crystallization time at 130° C. measured by differential scanning calorimeter (DSC) of the thermoplastic elastomer composition of the present invention is from 250 to 1,000 sec and, from the viewpoint of appearance of the molded body and mold release properties of the molded body at the time of injection molding, is preferably from 280 to 900 sec and more preferably from 300 to 800 sec.

In the present application, the crystallization time at 130° C. is the time required for a thermoplastic elastomer composition to crystallize when a molten thermoplastic elastomer composition is held at 130° C., and the time is defined as a holding time at 130° C. taken for a peak to be observed in an exothermic curve measured by differential scanning calorimeter (DSC) under the measurement conditions below.
Measurement Conditions A thermoplastic elastomer composition is melted by holding it at 220° C. for 5 min, then rapidly cooled to 130° C., and held at 130° C.

The swell ratio of the thermoplastic elastomer composition of the present invention is from 1.12 to 1.8 and, from the viewpoint of appearance of an injection-molded body, is preferably from 1.13 to 1.7 and more preferably from 1.14 to 1.6.

The swell ratio is the extent of swelling in strand diameter of a thermoplastic elastomer composition relative to orifice diameter when a molten thermoplastic elastomer composition is extruded via an orifice using a capillary type rheometer, and the swell ratio can be determined by extruding a thermoplastic elastomer composition via an orifice having a diameter of 1 mm and a length of 40 mm under conditions of a temperature of 200° C. and a shear rate of 1,216 $sec^{-1}$, and dividing the diameter of the resulting strand by the diameter of the orifice.

The melt viscosity at a temperature of 200° C. and a shear rate of 1,216 $sec^{-1}$ of the thermoplastic elastomer composition of the present invention is from 50 to 200 Pa·s and, from the viewpoint of appearance and impact strength at low temperature of an injection-molded body, is preferably from 70 to 180 Pa·s and more preferably from 80 to 160 Pa·s. The melt viscosity may be measured using a capillary type rheometer.

The propylene-based resin used in the present invention is a polymer containing a propylene-based monomer unit (propylene unit) as a main structural unit, or a mixture containing the polymer as a main component. The propylene-based resin may have a monomer unit based on another monomer in addition to the propylene unit. As the other monomer there can be cited ethylene and an α-olefin having from 4 to 20 carbon atoms. As the α-olefin there can be cited 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The monomer is preferably ethylene or an α-olefin having from 4 to 10 carbon atoms, and more preferably ethylene, 1-butene, 1-hexene, or 1-octene. One or more of these may be used.

Examples of the propylene-based resin include a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer. It is preferably a propylene homopolymer, or a copolymer of propylene and at least one monomer selected from ethylene and an α-olefin having from 4 to 10 carbon atoms. Each of these polymers may be used alone or in a combination of two or more.

From the viewpoint of impact strength at low temperature, heat resistance, and rigidity of a molded body the propylene unit content of the propylene-based resin, with the propylene-based resin as 100% by weight, is preferably from 70% to 100% by weight, and more preferably from 75% to 95% by weight. Furthermore, when the propylene unit content is reduced, the crystallization time increases. The propylene unit content may be determined by infrared spectroscopy.

From the viewpoint of appearance and tensile elongation at break of a molded body the melt flow rate (230° C., 21.18 N) of the propylene-based resin is preferably from 10 to 300 g/10 min, and more preferably from 20 to 200 g/10 min. Moreover, when the melt flow rate is reduced, the melt viscosity increases. When the melt flow rate is increased, the swell ratio reduces. The melt flow rate is measured in accordance with JIS K7210 under conditions of a temperature of 230° C. and a load of 21.18 N.

The propylene-based resin is preferably component (A) below, component (B) below, or a mixture containing component (A) and component (B), and is particularly preferably a mixture containing component (A) and component (B).
Component (A): preferably a propylene-based polymer containing components (p) and (q) below and having a melting temperature measured by differential scanning calorimeter of not less than 155° C.
Component (p): a propylene-based polymer having a propylene unit content of from 90% to 100% by weight (component (p) being 100% by weight)

component (q): an ethylene-α-olefin copolymer having an ethylene-based monomer unit (ethylene unit) content of from 20% to 80% by weight (component (q) being 100% by weight)

The propylene-based polymer of component (p) may contain a monomer unit based on another monomer in addition to the propylene-based monomer unit (propylene unit).

As the other monomer there can be cited ethylene and an α-olefin having from 4 to 20 carbon atoms. As the α-olefin there can be cited 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The monomer is preferably ethylene or an α-olefin having from 4 to 10 carbon atoms, and more preferably ethylene, 1-butene, 1-hexene, or 1-octene. One or more of these may be used.

From the viewpoint of heat resistance and rigidity of a molded body, the propylene unit content of component (p), with component (p) as 100% by weight, is preferably from 90% to 100% by weight, more preferably from 95% to 100% by weight, and yet more preferably from 98% to 100% by weight. Furthermore, when the propylene unit content is increased, the crystallization time shortens. The propylene unit content may be determined by infrared spectroscopy.

Examples of the propylene-based polymer of component (p) include a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer. It is preferably a propylene homopolymer, or a copolymer of propylene and at least one monomer selected from ethylene and an α-olefin having from 4 to 10 carbon atoms.

The ethylene-α-olefin copolymer of component (q) is a copolymer that contains an ethylene-based monomer unit (ethylene unit) and an α-olefin-based monomer unit (α-olefin unit). Examples of the α-olefin include propylene, 1-butene, 2-methylpropylene, 1-pentene, 3-methyl-1-butene, 1-hexene, 4-methyl-1-pentene, and 1-octene. It is preferably an α-olefin having from 3 to 10 carbon atoms, and more preferably propylene, 1-butene, 1-hexene, or 1-octene. One or more of these may be used.

The ethylene unit content of component (q), with component (q) as 100% by weight, is not less than 20% by weight and, from the viewpoint of impact strength at low temperature of a molded body, is preferably not less than 22% by weight and more preferably not less than 25% by weight. Furthermore, the ethylene unit content is not more than 80% by weight and, from the viewpoint of impact strength at low temperature of a molded body, is preferably not more than 60% by weight and more preferably not more than 50% by weight. From the viewpoint of impact strength at low temperature of a molded body, the α-olefin unit content of component (q), with component (q) as 100% by weight, is preferably not more than 80% by weight, more preferably not more than 78% by weight, and yet more preferably not more than 75% by weight. Furthermore, from the viewpoint of impact strength at low temperature of a molded body, the α-olefin unit content is preferably not less than 20% by weight, more preferably not less than 40% by weight, and yet more preferably not less than 50% by weight. Moreover, when the ethylene unit content is increased, the swell ratio reduces. The ethylene unit and α-olefin unit contents may be determined by infrared spectroscopy.

Examples of the ethylene-α-olefin copolymer of component (q) include an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, and an ethylene-propylene-1-octene copolymer. It is preferably a copolymer of an α-olefin having from 3 to 10 carbon atoms with ethylene.

From the viewpoint of appearance and impact strength at low temperature of a molded body, it is preferable that the content of component (p) in component (A) is from 70% to 90% by weight and the content of component (q) is from 30% to 10% by weight, it is more preferable that the content of component (p) is from 72% to 88% by weight and the content of component (q) is from 28% to 12% by weight, and it is yet more preferable that the content of component (p) is from 75% to 85% by weight and the content of component (q) is from 25% to 15% by weight, component (A) being 100% by weight. Furthermore, when the content of component (p) is increased (the content of component (q) is decreased), the swell ratio reduces.

Component (A) is preferably a propylene-based resin that does not have a threo-form —$CHCH_3$—$CHCH_3$— structure. It is surmised that in polymerization of propylene the threo-form —$CHCH_3$—$CHCH_3$— structure is formed by propylene undergoing 2,1 bonding to a polymer chain terminal at which propylene is 1,2 bonded such that the methyl group at the polymer chain terminal and the methyl group of the propylene that is polymerized next take opposite configurations along the polymer main chain.

The threo-form —$CHCH_3$—$CHCH_3$— structure may be examined by signals attributable to two methyl carbons of the threo-form —$CHCH_3$—$CHCH_3$— appearing in a $^{13}$C-NMR spectrum measured by carbon nuclear magnetic resonance ($^{13}$C-NMR). The signals attributable to the two methyl carbons are observed as two signals at around 15 ppm as described in the scientific literature 'Macromolecules', (USA), American Chemical Society, 1994, Vol. 27, p. 7538-7543 and 'Macromolecules', (USA), American Chemical Society, 1999, Vol. 32, p. 8383-8290. The intensity ratio of the two signals, as peak area of peak on higher magnetic field side/peak area of peak on lower magnetic field side, is usually from 0.5 to 1.5.

From the viewpoint of appearance of a molded body, component (A) is preferably one having a ratio ($[\eta cxs]/[\eta cxis]$) of the intrinsic viscosity (135° C., tetralin) $[\eta cxs]$ of a fraction that is soluble in xylene at 20° C. to the intrinsic viscosity (135° C., tetralin) $[\eta cxis]$ of a fraction that is insoluble in xylene at 20° C. of from 1.6 to 8, and more preferably a ratio ($[\eta cxs]/[\eta cxis]$) of from 1.8 to 7. Furthermore, when ($[\eta cxs]/[\eta cxis]$) is increased, the swell ratio increases. The intrinsic viscosity is determined by measuring reduced viscosity in tetralin at 135° C. using an Ubbelohde viscometer and calculating by an extrapolation method in accordance with a calculation method described in 'Kobunshi Yoeki, Kobunshi Jikkengaku 11' (Polymer Solutions, Polymer Experiments) (Koritsu Shuppan Co., Ltd., 1982), p. 491. The xylene-soluble fraction (CXS fraction) at 20° C. and the xylene-insoluble fraction (CXIS fraction) at 20° C. referred to here may be obtained by the following method. After about 5 g of component (A) is completely dissolved in 500 mL of boiling xylene, the xylene solution is gradually cooled to room temperature and conditioned at 20° C. for not less than 4 hours, and a precipitate and the solution are separated by filtration. Polymer that has dissolved in the solution is collected by removing the solvent from the solution, thus giving the CXS part.

From the viewpoint of mold release properties of a molded body at the time of injection molding, the melting temperature of component (A) is preferably not less than 155° C., and more preferably not less than 160° C. Furthermore, the melting temperature is usually not more than 175° C. The melting temperature is the peak temperature of an endothermic peak with the highest peak temperature of during Step (ii) in a differential scanning calorimetry curve measured by differential scanning calorimeter. Measurement of a differential scanning calorimetry curve by differential scanning calorimeter is carried out under the following conditions, and the melting temperature is determined from the differential scanning calorimetry curve by a temperature increase operation.

Conditions

Step (i): melted at 220° C. and then cooled from 220° C. to −90° C. at a rate of 5° C./min.

Step (ii): immediately after Step (i), heated from −90° C. to 200° C. at a rate of 5° C./min.

From the viewpoint of appearance and tensile elongation at break of a molded body, the melt flow rate (230° C., 21.18 N) of component (A) is preferably from 10 to 300 g/10 min, and more preferably from 20 to 200 g/10 min. Furthermore, when the melt flow rate is decreased, the melt viscosity increases. When the melt flow rate is increased, the swell ratio decreases. The melt flow rate is measured in accordance with JIS K7210 under conditions of a temperature of 230° C. and a load of 21.18 N.

As a method for producing the propylene-based resin of component (A), a known polymerization method employing a known olefin polymerization catalyst may be used. Examples thereof include a multistage polymerization method employing a Ziegler-Natta type catalyst. The multistage polymerization method may employ a slurry polymerization method, a solution polymerization method, a bulk polymerization method, a gas-phase polymerization method, etc., and they may be used in a combination of two or more. It is also possible to use a corresponding commercial product.

The thermoplastic elastomer composition of the present invention preferably contains component (B).

component (B): a crystalline propylene-ethylene copolymer having a propylene-based monomer unit content of from 70% to 97% by weight, an ethylene-based monomer unit content of from 30% to 3% by weight (the total of the propylene-based monomer unit content and the ethylene-based monomer unit content being 100% by weight), a melt flow rate (230° C., 21.18 N) of from 1 to 100 g/10 min, and a melting temperature measured by differential scanning calorimeter of from 80° C. to 130° C.

Component (B) is a crystalline propylene-ethylene copolymer that contains a propylene unit and an ethylene unit. It is preferable that the propylene unit content of component (B) is from 70% to 97% by weight and the ethylene unit content is from 30% to 3% by weight, and it is more preferable that the propylene unit content is from 85% to 97% by weight and the ethylene unit content is from 15% to 3% by weight, the total of the propylene unit content and the ethylene unit content being 100% by weight. The propylene unit content and the ethylene unit content may be determined by infrared spectroscopy.

The propylene-ethylene copolymer of component (B) is crystalline, and it is more preferable that its crystallization enthalpy is not less than 20 mJ/mg, and yet more preferably from 20 to 100 mJ/mg. The crystallization enthalpy may be determined from the area of an exothermic peak measured by heat-flux differential scanning calorimeter. Specifically, a differential scanning calorimetry curve is measured by cooling the copolymer from 220° C. to −90° C. at a rate of temperature decrease of 5° C./min, and crystallization enthalpy can be determined from the area of a section surrounded by the differential scanning calorimetry curve thus obtained and a baseline.

Component (B) is preferably a crystalline propylene-ethylene copolymer that has a threo-form —CHCH$_3$—CHCH$_3$— structure. The threo-form —CHCH$_3$—CHCH$_3$— structure is as described above, and can be examined by signals attributable to two methyl carbons of the threo-form —CHCH$_3$—CHCH$_3$— appearing in a $^{13}$C-NMR spectrum.

From the viewpoint of appearance and tensile elongation at break of a molded body, the melt flow rate (230° C., 21.18 N) of component (B) is preferably from 1 to 100 g/10 min, more preferably from 10 to 80 g/10 min and yet more preferably 15 to 50 g/10 min.

Furthermore, when the melt flow rate is decreased, the melt viscosity increases. The melt flow rate is measured in accordance with JIS K7210 under conditions of a temperature of 230° C. and a load of 21.18 N.

Examples of a method for producing the crystalline propylene-ethylene copolymer of component (B) include a slurry polymerization method, a solution polymerization method, a bulk polymerization method, and a gas-phase polymerization method that employ a non-metallocene type complex catalyst such as a heteroaryl ligand catalyst described in JP•PCT•2005-508416. It is also possible to employ a corresponding commercial product.

From the viewpoint of appearance, impact strength at low temperature, tensile elongation at break, and rigidity of a molded body, the content of component (B), relative to 100 parts by weight of component (A), is preferably from 10 to 100 parts by weight, more preferably from 15 to 90 parts by weight, and yet more preferably from 20 to 80 parts by weight. Furthermore, when the content of component (B) is decreased, the crystallization time shortens.

The ethylene-α-olefin copolymer rubber that is used as component (C) in the present invention is a copolymer rubber that contains an ethylene-based monomer unit (ethylene unit) and an α-olefin-based monomer unit α-olefin unit).

As the α-olefin there can be cited propylene 1-butene, 2-methylpropylene, 1-pentene, 3-methyl-1-butene, 1-hexene, 4-methyl-1-pentene and 1-octene. The monomer is preferably an α-olefin having from 3 to 10 carbon atoms, and more preferably propylene, 1-butene, 1-hexene, or 1-octene. One or more of these may be used.

The ethylene-α-olefin copolymer rubber may contain another monomer unit such as a monomer unit based on a non-conjugated diene (non-conjugated diene unit) in addition to an ethylene unit and an α-olefin unit. As the non-conjugated diene, there can be cited aliphatic non-conjugated dienes such as 1,4-hexadiene, 1,6-octadiene, 2-methyl-1,5-hexadiene, 6-methyl-1,5-heptadiene, and 7-methyl-1,6-octadiene; and cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene. It is preferably 5-ethylidene-2-norbornene or dicyclopentadiene.

The ethylene unit content of the ethylene-α-olefin copolymer rubber is not less than 35% by weight and, from the viewpoint of impact strength at low temperature of a molded body, is preferably not less than 45% by weight and more preferably not less than 55% by weight. Furthermore, from the viewpoint of rigidity, the ethylene unit content is not more than 75% by weight, preferably not more than 73% by weight, and more preferably not more than 70% by weight. The α-olefin unit content of the ethylene-α-olefin copolymer rubber is not more than 65% by weight and, from the viewpoint of impact strength at low temperature of a molded body, is preferably not more than 55% by weight and more preferably not more than 45% by weight. Furthermore, the α-olefin unit content is not less than 25% by weight and, from the viewpoint of rigidity, is preferably not less than 27% by weight and more preferably not less than 30% by weight. Furthermore, when the ethylene unit content is increased, the crystallization time shortens. The total of the ethylene unit content and the α-olefin unit content is 100% by weight. The ethylene unit content and the α-olefin unit content may be determined by infrared spectroscopy.

The non-conjugated diene unit content of the ethylene-α-olefin copolymer rubber, with component (C) as 100% by weight, is usually from 0% to 10% by weight, and preferably from 0% to 5% by weight. The non-conjugated diene unit content may be determined by infrared spectroscopy.

Examples of the ethylene-α-olefin copolymer rubber include ethylene-propylene copolymer rubber, ethylene-1-butene copolymer rubber, ethylene-1-hexene copolymer rubber, ethylene-1-octene copolymer rubber, ethylene-propylene-1-butene copolymer rubber, ethylene-propylene-1-hexene copolymer rubber, ethylene-propylene-1-octene copolymer rubber, ethylene-propylene-5-ethylidene-2-norbornene copolymer rubber, ethylene-propylene-dicyclopentadiene copolymer rubber, ethylene-propylene-1,4-hexadiene copolymer rubber, and ethylene-propylene-5-vinyl-2-norbornene copolymer rubber. They may be used alone or in a combination of two or more. Among these, it is preferably an ethylene-propylene copolymer or an ethylene-propylene-5-ethylidene-2-norbornene copolymer in which, with the total of the ethylene unit and the propylene unit as 100% by weight, the ethylene unit content is from 55% to 70% by weight and the propylene unit content is from 45% to 30% by weight and, with the polymer as 100% by weight, the 5-ethylidene-2-norbornene unit content is from 0% to 10% by weight.

From the viewpoint of appearance, impact strength at low temperature, and tensile elongation at break of a molded body, the Mooney viscosity ($ML_{1+4}$ 125° C.) measured at 125° C. of the ethylene-α-olefin copolymer rubber is preferably from 30 to 100, and more preferably from 35 to 80. Furthermore, when the Mooney viscosity is decreased, the swell ratio decreases. The Mooney viscosity is measured in accordance with ASTM D-1646.

As a method for producing the ethylene-α-olefin copolymer rubber, a known polymerization method employing a known olefin polymerization catalyst may be used. Examples thereof include a slurry polymerization method, a solution polymerization method, a bulk polymerization method, and a gas-phase polymerization method that employ a Ziegler-Natta type catalyst, a complex type catalyst such as a metallocene type complex or a non-metallocene type complex, etc. It is also possible to use a corresponding commercial product.

In the thermoplastic elastomer composition of the present invention, from the viewpoint of appearance, impact strength at low temperature, tensile elongation at break, and rigidity of a molded body, the content of the ethylene-α-olefin copolymer rubber, relative to 100 parts by weight of the propylene-based resin, is preferably from 25 to 180 parts by weight, more preferably from 40 to 160 parts by weight, and yet more preferably from 60 to 125 parts by weight. Furthermore, when the content of the ethylene-α-olefin copolymer rubber is increased, the crystallization time increases. When the content of the ethylene-α-olefin copolymer rubber is decreased, the swell ratio decreases.

The thermoplastic elastomer composition of the present invention preferably contains components (A), (B), and (C). It is preferable that, relative to 100 parts by weight of component (A), the content of component (B) is from 10 to 100 parts by weight and the content of component (C) is from 50 to 200 parts by weight; from the viewpoint of appearance, impact strength at low temperature, tensile elongation at break, and rigidity of a molded body it is more preferable that the content of component (B) is from 15 to 90 parts by weight and the content of component (C) is from 80 to 180 parts by weight, and it is yet more preferable that the content of component (B) is from 20 to 80 parts by weight and the content of component (C) is from 100 to 150 parts by weight.

The thermoplastic elastomer composition of the present invention may contain as necessary, in a range that does not impair the object of the present invention, an inorganic filler (talc, calcium carbonate, calcined kaolin, etc.), an organic filler (fiber, wood flour, cellulose powder, etc.), a lubricant (silicone oil, silicone rubber, etc.), an antioxidant (phenol-based, sulfur-based, phosphorus-based, lactone-based, vitamin-based, etc.), a weathering stabilizer, a UV absorber (benzotriazole-based, triazine-based, anilide-based, benzophenone-based, etc.), a heat stabilizer, a light stabilizer (hindered amine-based, benzoate-based, etc.), a pigment, a nucleating agent, an adsorbent (metal oxide (zinc oxide, magnesium oxide, etc.), metal chloride (iron chloride, calcium chloride, etc.), hydrotalcite, aluminate, etc.), etc.

From the viewpoint of mold release properties of a molded body at the time of injection molding and surface texture of a molded body, the thermoplastic elastomer composition of the present invention preferably contains component (X) below. Component (X): at least one compound selected from the compound group consisting of a fatty acid having not less than 5 carbon atoms, a fatty acid metal salt having not less than 5 carbon atoms, a fatty acid amide having not less than 5 carbon atoms, and a fatty acid ester having not less than 5 carbon atoms.

Examples of the fatty acid having not less than 5 carbon atoms of component (X) include lauric acid, palmitic acid, stearic acid, behenic acid, oleic acid, erucic acid, linoleic acid, and ricinoleic acid.

Examples of the fatty acid metal salt having not less than 5 carbon atoms of component (X) include salts of the above-mentioned fatty acids with a metal such as Li, Na, Mg, Al, K, Ca, Zn, Ba, or Pb, and specific examples thereof include lithium stearate, sodium stearate, calcium stearate, and zinc stearate.

Examples of the fatty acid amide having not less than 5 carbon atoms of component (X) include lauric acid amide, palmitic acid amide, stearic acid amide, oleic acid amide, erucic acid amide, methylenebisstearic acid amide, ethylenebisstearic acid amide, ethylenebisoleic acid amide, and stearic acid diethanolamide. Among them, erucic acid amide is preferable.

Examples of the fatty acid ester having not less than 5 carbon atoms of component (X) include esters of the above fatty acids with an alcohol such as an aliphatic alcohol (myristyl alcohol, palmityl alcohol, stearyl alcohol, behenyl alcohol, 12-hydroxystearyl alcohol, etc.), an aromatic alcohol (benzyl alcohol, β-phenylethyl alcohol, phthalyl alcohol, etc.), or a polyhydric alcohol (glycerol, diglycerol, polyglycerol, sorbitan, sorbitol, propylene glycol, polypropylene glycol, polyethylene glycol, pentaerythritol, trimethylolpropane, etc.), and specific examples thereof include glycerol monooleate, glycerol dioleate, polyethylene glycol monostearate, and citric acid distearate.

When component (X) is contained, the content of component (X), relative to 100 parts by weight of the total of the propylene-based resin and the olefin-based copolymer rubber, is preferably from 0.01 to 1.5 parts by weight, and more preferably from 0.05 to 1 parts by weight.

The thermoplastic elastomer composition of the present invention may be obtained by melt kneading a propylene-based resin and an olefin-based copolymer rubber, and another component as necessary, by a known method such as, for example, a twin shaft extruder or a Banbury mixer.

The thermoplastic elastomer composition of the present invention may be molded into molded bodies with various shapes by a known molding method such as, for example, an injection molding method or a compression molding method. The molding method is preferably an injection molding method.

In injection molding, from the viewpoint of appearance of a molded body, the temperature of the thermoplastic elastomer composition at the time of injection is preferably from 170° C. to 260° C., and more preferably from 190° C. to 240° C.

In injection molding, from the viewpoint of appearance and mold release properties of a molded body, the mold temperature is preferably from 30° C. to 75° C., and more preferably from 40° C. to 65° C.

In injection molding, from the viewpoint of appearance of a molded body, the rate at which a molten thermoplastic elastomer composition is charged into a mold (prior to switching over holding pressure) is preferably from 10 to 300 g/sec, and more preferably from 30 to 200 g/sec.

In injection molding, from the viewpoint of appearance of a molded body, the pressure and time for holding the pressure after a molten thermoplastic elastomer composition is injected and charged into a mold are preferably set so that the amount of molten thermoplastic elastomer composition charged into the mold while the pressure is held is small, are more preferably set so that, with the molded body as 100% by weight, the amount of molten thermoplastic elastomer composition charged into the mold while the pressure is held is not more than 10% by weight, and are yet more preferably set so that it is not more than 7% by weight.

A molded body formed by molding the thermoplastic elastomer composition of the present invention is suitably used as an automobile interior material, and particularly as an airbag cover. Examples of the airbag cover include a driver's seat airbag cover, a passenger seat airbag cover, a side airbag cover, a knee airbag cover, and a curtain airbag cover.

In accordance with the present invention, a polyolefin-based thermoplastic elastomer composition that can give an airbag cover having excellent appearance.

EXAMPLES

The present invention is illustrated in detail by reference to Examples and Comparative Examples.
I. Measurement/Evaluation
1. Melt Flow Rate (MFR, Units: g/10 Min)
Measured in accordance with JIS K7210 under conditions of a temperature of 230° C. and a load of 21.18 N.
2. Mooney Viscosity ($ML_{1+4}$)
Measured in accordance with ASTM D-1646.
3. Ethylene Unit and Propylene Unit Contents (Units: % by Weight)
Measured by infrared spectroscopy.
4. Melting Temperature (Units: ° C.)
Determined from a differential scanning calorimetry curve during Step (ii) measured under the conditions below using a heat-flux differential scanning calorimeter (trade name: DSC RDC220, manufactured by Seiko Instruments Inc.).
Conditions
Step (i): melted at 220° C. and then cooled from 220° C. to −90° C. at a rate of 5° C./min.
Step (ii): immediately after Step A, heated from −90° C. to 200° C. at a rate of 5° C./min.
5. Crystallization Enthalpy ($\Delta H$, Units: mJ/mg)
Determined from the area of a section surrounded by a differential scanning calorimetry curve and a baseline obtained by measuring under the conditions below using a heat-flux differential scanning calorimeter (trade name: DSC RDC220, manufactured by Seiko Instruments Inc.).
Conditions
Step (iii): melted at 220° C. and then cooled from 220° C. to −90° C. at a rate of 5° C./min.
6. Threo-form —$CHCH_3$—$CHCH_3$— Structure
Determined using a signal at around 15 ppm in a $^{13}$C-NMR spectrum of a polymer measured by carbon nuclear magnetic resonance ($^{13}$C-NMR) under condition below.
Condition
Instrument: ARX600, Bruker
Solvent: mixed solvent of 1,2-dichlorobenzene/1,2-dichlorobenzene-d4 (80/20)
Sample concentration: 300 mg/3 mL of solvent
Temperature: 135° C.
Measurement mode: proton decoupling
Pulse width: 45 degrees
Pulse repetition time: 4 sec
Number of repetitions: 3000 times
Reference: tetramethylsilane
7. Intrinsic Viscosity ([ηcxs], [ηcxis], Units: dL/g)
Measured at 135° C. using an Ubbelohde viscometer with tetralin as a solvent.
8. Crystallization Time
Determined as the time held at 130° C. until an exothermic curve peak was observed under the conditions below using a differential scanning calorimeter (trade name: Diamond DSC, manufactured by Perkin Elmer).
Conditions
A sample (about 8 mg) was melted by holding it at 220° C. for 5 min, then rapidly cooled to 130° C., and held at 1300.
9. Swell Ratio
Determined by extruding a molten thermoplastic elastomer composition via an orifice having a diameter of 1 mm and a length of 40 mm under conditions of a temperature of 200° C. and a shear rate of 1,216 $sec^{-1}$ using a capillary rheometer (trade name: Capillograph 1C, manufactured by Toyo Seiki Seisaku-sho, Ltd.) to give a strand, and dividing the diameter of the strand by the diameter of the orifice to give a swell ratio.
10. Melt Viscosity
The melt viscosity of a thermoplastic elastomer composition was measured by extruding the molten thermoplastic elastomer composition via an orifice having a diameter of 1 mm and a length of 40 mm under conditions of a temperature of 200° C. and a shear rate of 1,216 $sec^{-1}$ using a capillary rheometer (trade name: Capillograph 1C, manufactured by Toyo Seiki Seisaku-sho, Ltd.).
11. Flexural Modulus (Units: MPa)
Measured in accordance with JIS K7171 under conditions of a span length of 30 mm and a flexural rate of 1 mm/minute using a 2 mm thick test piece cut out from a sheet-shaped injection-molded body.

12. Tensile Elongation at Break (Units: %)

Measured in accordance with JIS K6251 under conditions of a test speed of 200 mm/min using a No. 3 dumbbell-shaped (JIS K6251) test piece stamped out from a sheet-shaped injection-molded body.

13. Impact Strength at Low Temperature

Measured in accordance with JIS K7110 at a temperature of −40° C. using a 2 mm thick test piece cut out from a sheet-shaped injection-molded body. When broken, denoted by 'B', and when not broken, denoted by 'NB'.

14. Appearance of Injection-Molded Body

Evaluated as follows by visually examining appearance of a box-shaped injection-molded body in terms of the occurrence of flow marks and uneven gloss in a tear line section.
'A': Good
'B': Fair
'C': Poor II. Samples 1. Propylene-Based Resin A-1: propylene homopolymer/propylene-ethylene copolymer multistage-polymerized resin
MFR=56 g/10 min,
component (p) content=87% by weight,
component (q) content=13% by weight,
component (p) propylene unit content=100% by weight,
component (q) ethylene unit content=40% by weight,
melting temperature=163.5° C.,
$[\eta cxs]/[\downarrow cxis]=4.4$,
signal attributable to two methyl carbons of threo-form —$CHCH_3$—$CHCH_3$— not detected)

A-2: propylene-ethylene copolymer
MFR=28 g/10 min,
component (p) content=100% by weight,
component (q) content=0% by weight,
component (p) propylene unit content=96% by weight,
melting temperature=141.5° C., signal attributable to two methyl carbons of threo-form —$CHCH_3$—$CHCH_3$— not detected A-3: propylene homopolymer
MFR=120 g/10 min,
component (p) content=100% by weight,
component (q) content=0% by weight,
component (p) propylene unit content=100% by weight,
melting temperature=165.1° C.,
signal attributable to two methyl carbons of threo-form —$CHCH_3$—$CHCH_3$— not detected A-4: Marlex AGN650, manufactured by Phillips Sumika Polypropylene Company
MFR=69 g/10 min 2. Crystalline Propylene-Ethylene Copolymer B-1: trade name: Versify DP4000, manufactured by The Dow Chemical Company
MFR=25 g/10 min,
ethylene unit content=5.3% by weight,
melting temperature=114.5° C.,
crystallization enthalpy ($\Delta H$)=70 mJ/mg,
signals attributable to two methyl carbons of threo-form —$CHCH_3$—$CHCH_3$— detected (peak area of peak on higher magnetic field side/peak area of peak on lower magnetic field side=0.99)

B-2: trade name: Versify DE4301, manufactured by The Dow Chemical Company
MFR=25 g/10 min,
ethylene unit content=12.1% by weight,
melting temperature=99° C.,
crystallization enthalpy ($\Delta H$)=31 mJ/mg,
signals attributable to two methyl carbons of threo-form —$CHCH_3$—$CHCH_3$— detected (peak area of peak on higher magnetic field side/peak area of peak on lower magnetic field side=0.87)

3. Ethylene-α-olefin Copolymer Rubber

C-1: ethylene-propylene-5-ethylidene-2-norbornene copolymer rubber
Mooney viscosity ($ML_{1+4}$, 125° C.)=64,
ethylene unit content/propylene unit content=70% by weight/30% by weight Example 1

Thermoplastic Elastomer Composition 100 parts by weight of propylene-based resin A-1,
150 parts by weight of ethylene-α-olefin copolymer rubber C-1,
0.05 parts by weight of erucic acid amide (trade name: NEUTRON S, manufactured by Nippon Fine Chemical Co., Ltd.),
0.15 parts by weight of antioxidant (0.1 parts by weight of Sumilizer GA80, Sumitomo Chemical Co., Ltd. and 0.05 parts by weight of IRGAFOS 168, Ciba Specialty Chemicals), and
1.0 part by weight of a black pigment (trade name: SPEC 824, manufactured by Sumika Color Co., Ltd.) were melt-kneaded using a Banbury mixer, thus giving a thermoplastic elastomer composition. The results of measurement of the physical properties of the thermoplastic elastomer composition were shown in Table 1.

Injection-Molded Body for Evaluation of Physical Properties

The thermoplastic elastomer composition was molded into a molded body in a shape with a length of 90 mm, a width of 150 mm, and a thickness of 2 mm using an injection molding machine (trade name: EC160NII, manufactured by Toshiba Machine Co., Ltd) at a cylinder temperature of 220° C. and a mold temperature of 50° C. It was also molded into a molded body in a box-shape with a 0.5 mm thickness tear line section under conditions of a cylinder temperature of 220° C. and a mold temperature of 35° C. The results of evaluation of the molded bodies were shown in Table 1.

Example 2

The same operation as Example 1 was carried out except that 100 parts by weight of A-1 and 28 parts by weight of B-1 were used as the propylene-based resin. The results were shown in Table 1.

Example 3

The same operation as Example 1 was carried out except that 100 parts by weight of A-1 and 28 parts by weight of B-2 were used as the propylene-based resin. The results were shown in Table 1.

Example 4

The same operation as Example 1 was carried out except that 100 parts by weight of A-1 and 56 parts by weight of B-1 were used as the propylene-based resin. The results were shown in Table 1.

Comparative Example 1

The same operation as Example 1 was carried out except that 100 parts by weight of A-2 was used as the propylene-based resin. The results were shown in Table 1.

Comparative Example 2

The same operation as Example 1 was carried out except that 100 parts by weight of A-2 and 28 parts by weight of B-1 were used as the propylene-based resin. The results were shown in Table 1.

Comparative Example 3

The same operation as Example 1 was carried out except that 100 parts by weight of A-3 and 28 parts by weight of B-1 were used as the propylene-based resin. The results were shown in Table 1.

Comparative Example 4

The same operation as Example 1 was carried out except that 100 parts by weight of A-4 and 28 parts by weight of B-1 were used as the propylene-based resin. The results were shown in Table 1.

TABLE 1

|  |  | Ex. 1 | Ex. 2 | Ex. 3 | Ex. 4 | Comp. Ex. 1 | Comp. Ex. 2 | Comp. Ex. 3 | Comp. Ex. 4 |
| --- | --- | --- | --- | --- | --- | --- | --- | --- | --- |
| Component |  |  |  |  |  |  |  |  |  |
| A-1 | parts by wt. | 100 | 100 | 100 | 100 | — | — | — | — |
| A-2 | parts by wt. | — | — | — | — | 100 | 100 | — | — |
| A-3 | parts by wt. | — | — | — | — | — | — | 100 | — |
| A-4 | parts by wt. | — | — | — | — | — | — | — | 100 |
| B-1 | parts by wt. | — | 28 | — | 56 | — | 28 | 28 | 28 |
| B-2 | parts by wt. | — | — | 28 | — | — | — | — | — |
| C-1 | parts by wt. | 150 | 150 | 150 | 150 | 150 | 150 | 150 | 150 |
| Composition |  |  |  |  |  |  |  |  |  |
| MFR | g/10 min | 4.9 | 6.6 | 6.3 | 6.5 | 2.1 | 3.1 | 8.5 | 6.3 |
| Crystallization time | sec | 280 | 385 | 301 | 730 | 1300 | 1090 | 52 | 34 |
| Swell ratio | — | 1.12 | 1.15 | 1.14 | 1.16 | 1.13 | 1.09 | 1.08 | 1.05 |
| Melt viscosity | Pa·s | 140 | 137 | 139 | 130 | 226 | 199 | 121 | 151 |
| Molded body |  |  |  |  |  |  |  |  |  |
| Flexural modulus | MPa | 270 | 270 | 210 | 280 | 180 | 150 | 290 | 180 |
| Tensile elongation at break | % | 520 | 590 | 580 | 660 | 440 | 560 | 430 | 560 |
| Impact strength at low temperature | — | NB | NB | NB | NB | NB | NB | NB | NB |
| Appearance |  |  |  |  |  |  |  |  |  |
| Flow marks | — | A | A | A | A | C | C | C | C |
| Uneven gloss in a tear line section | — | B | A | A | A | C | C | C | C |

The invention claimed is:

1. A thermoplastic elastomer composition comprising a propylene-based resin; and an ethylene-α-olefin copolymer rubber; wherein the composition has a crystallization time at 130° C. measured by differential scanning calorimeter (DSC) of from 250 to 1,000 sec, and
    wherein the propylene-based resin comprises component (A) and component (B), and the ethylene-α-olefin copolymer rubber comprises component (C),
    component (A): a propylene-based resin comprising 70% to 90% by weight of component (p) and 30% to 10% by weight of component (q) relative to 100% by weight of component (A) and having a melting temperature measured by differential scanning calorimeter of not less than 155° C.,
    component (p): a propylene-based polymer having a propylene-based monomer unit content of from 90% to 100% by weight,
    component (q): an ethylene-α-olefin copolymer having an ethylene-based monomer unit content of from 20% to 80% by weight;
    component (B): a crystalline propylene-ethylene copolymer having a propylene-based monomer unit content of from 70% to 97% by weight, an ethylene-based monomer unit content of from 30% to 3% by weight, a melt flow rate measured at 230° C. and 21.18 N of from 1 to 100 g/10 min, and a melting temperature measured by differential scanning calorimeter of from 80° C. to 130° C.;
    component (C): an ethylene-α-olefin copolymer rubber having an ethylene-based monomer unit content of from 35% to 75% by weight, an α-olefin-based monomer unit content of from 65% to 25% by weight, and a Mooney viscosity $ML_{1+4}$, 125° C. of from 30 to 100,
    wherein the composition comprises 100 parts by weight of component (A), 10 to 100 parts by weight of component (B), and 50 to 200 parts by weight of component (C),
    wherein component (A) is a propylene-based resin that does not have a threo-form —CHCH$_3$—CHCH$_3$— structure, and component (B) is a crystalline propylene-ethylene copolymer that has a threo-form —CHCH$_3$—CHCH$_3$— structure, and
    wherein component (A) has the ratio of [ηcxs] to [ηcxis] ([ηcxs]/[ηcxis]) of from 1.8 to 8; [ηcxs]: the intrinsic viscosity measured at 135° C., in tetralin of a xylene-soluble fraction at 20° C., [ηcxis]: the intrinsic viscosity measured at 135° C., in tetralin of a xylene-insoluble fraction at 20° C., and wherein component (A) has a propylene unit content of from 94.8% to 98% by weight.

2. The thermoplastic elastomer composition according to claim 1, wherein the composition has a swell ratio of from 1.12 to 1.8.

3. The thermoplastic elastomer composition according to claim 1, wherein the composition has a melt viscosity at a temperature of 200° C. and a shear rate of 1,216 sec$^{-1}$ of from 50 to 200 Pa·s.

4. The thermoplastic elastomer composition according to claim 1, wherein the propylene-based resin has a melt flow rate measured at 230° C. and 21.18 N of from 10 to 300 g/10 min.

5. The thermoplastic elastomer composition according to claim 1, wherein component (A) has the ratio of [ηcxs] to [ηcxis] ([ηcxs]/[ηcxis]) of from 1.8 to 7:

[ηcxs]: the intrinsic viscosity measured at 135° C. in tetralin, of a xylene-soluble fraction at 20° C.,

[ηcxis]: the intrinsic viscosity measured at 135° C. in tetralin, of a xylene-insoluble fraction at 20° C.

6. The thermoplastic elastomer composition according to claim 1, wherein component (A) has a melt flow rate measured at 230° C. and 21.18 N of from 10 to 300 g/10 min.

7. The thermoplastic elastomer composition according to claim 1, wherein component (B) has a crystallization enthalpy of not less than 20 mJ/mg.

8. The thermoplastic elastomer composition according to claim 1, wherein component (C) is an ethylene-propylene copolymer or an ethylene-propylene-5-ethylidene-2-norbornene copolymer and has an ethylene unit content of from 55% to 70% by weight, a propylene unit content of from 45% to 30% by weight with the total of ethylene and propylene units as 100% by weight, and a 5-ethylidene-2-norbornene unit content of from 0% to 10% by weight with the polymer as 100% by weight.

9. A method for producing a molded body, the method comprising:

preparing the thermoplastic elastomer composition as defined in claim 1; and injection molding the thermoplastic elastomer composition.

10. A molded body produced by the method according to claim 9.

* * * * *